(12) United States Patent
Arellano

(10) Patent No.: US 6,829,426 B1
(45) Date of Patent: Dec. 7, 2004

(54) FLEXIBLE OPTICAL CIRCUIT FOR USE IN AN ERBIUM-DOPED FIBER AMPLIFIER AND METHOD FOR FABRICATING THE FLEXIBLE OPTICAL CIRCUIT

(76) Inventor: Aaron G. Arellano, 14501 Montfort Dr. #108, Dallas, TX (US) 75254

( * ) Notice: Subject to any disclaimer, the term of this patent is extended or adjusted under 35 U.S.C. 154(b) by 0 days.

(21) Appl. No.: 10/127,089

(22) Filed: Apr. 22, 2002

(51) Int. Cl.⁷ .............................. G02B 6/44; G02B 6/00; H04B 10/12
(52) U.S. Cl. ...................... 385/135; 385/114; 359/341.1
(58) Field of Search ................................. 385/114, 135; 359/341.1–341.5

(56) References Cited

U.S. PATENT DOCUMENTS

| | | | |
|---|---|---|---|
| 5,463,229 A | * 10/1995 | Takase et al. | 257/59 |
| 6,005,991 A | 12/1999 | Knasel | 385/14 |
| 6,088,493 A | 7/2000 | Brenner | 385/17 |
| 6,538,207 B1 | * 3/2003 | Barth | 174/254 |
| 2001/0041025 A1 | * 11/2001 | Farahi | 385/14 |
| 2002/0024726 A1 | * 2/2002 | Hamada | 359/341.3 |
| 2003/0035204 A1 | * 2/2003 | Ahn et al. | 359/341.3 |
| 2003/0044141 A1 | * 3/2003 | Melton et al. | 385/114 |

OTHER PUBLICATIONS

"Flat Flexible Erbium–Doped Fiber–Coil Sheet (EDF–Sheet)", Version 1.1, Feb. 6, 2002.

* cited by examiner

Primary Examiner—John D. Lee
Assistant Examiner—Tina Lin
(74) Attorney, Agent, or Firm—Lanier Ford Shaver & Payne P.C.; George P. Kobler

(57) ABSTRACT

An erbium-doped fiber amplifier, a flexible optical circuit and a method for fabricating the flexible optical circuit are described herein. Basically, the erbium-doped amplifier includes a laser diode, a multiplexer and a flexible optical circuit. The flexible optical circuit in one embodiment includes a predetermined length of optical fiber that is placed onto and secured to a partially flexible sheet of material. Several different embodiments of the flexible optical circuit are described herein. In operation, the erbium-doped amplifier receives an optical signal that is coupled by the multiplexer along with a light from the laser diode into the erbium-doped optical fiber which becomes excited by the light from the laser diode and outputs an amplified optical signal.

24 Claims, 8 Drawing Sheets

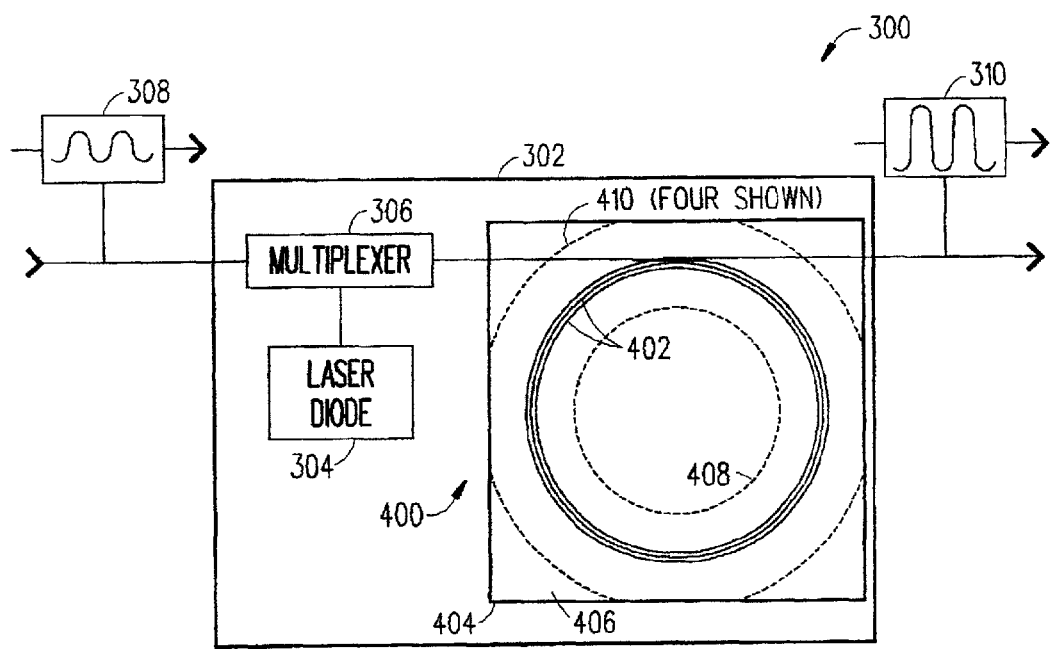
FIG. 3
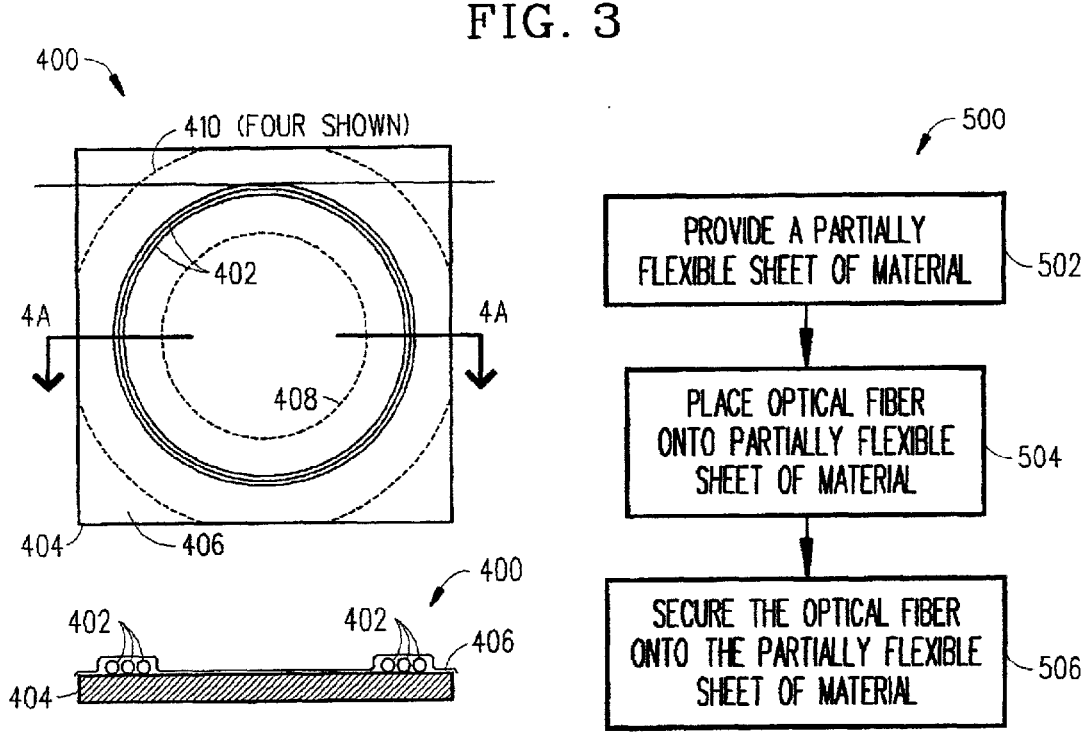
FIG. 4
FIG. 5

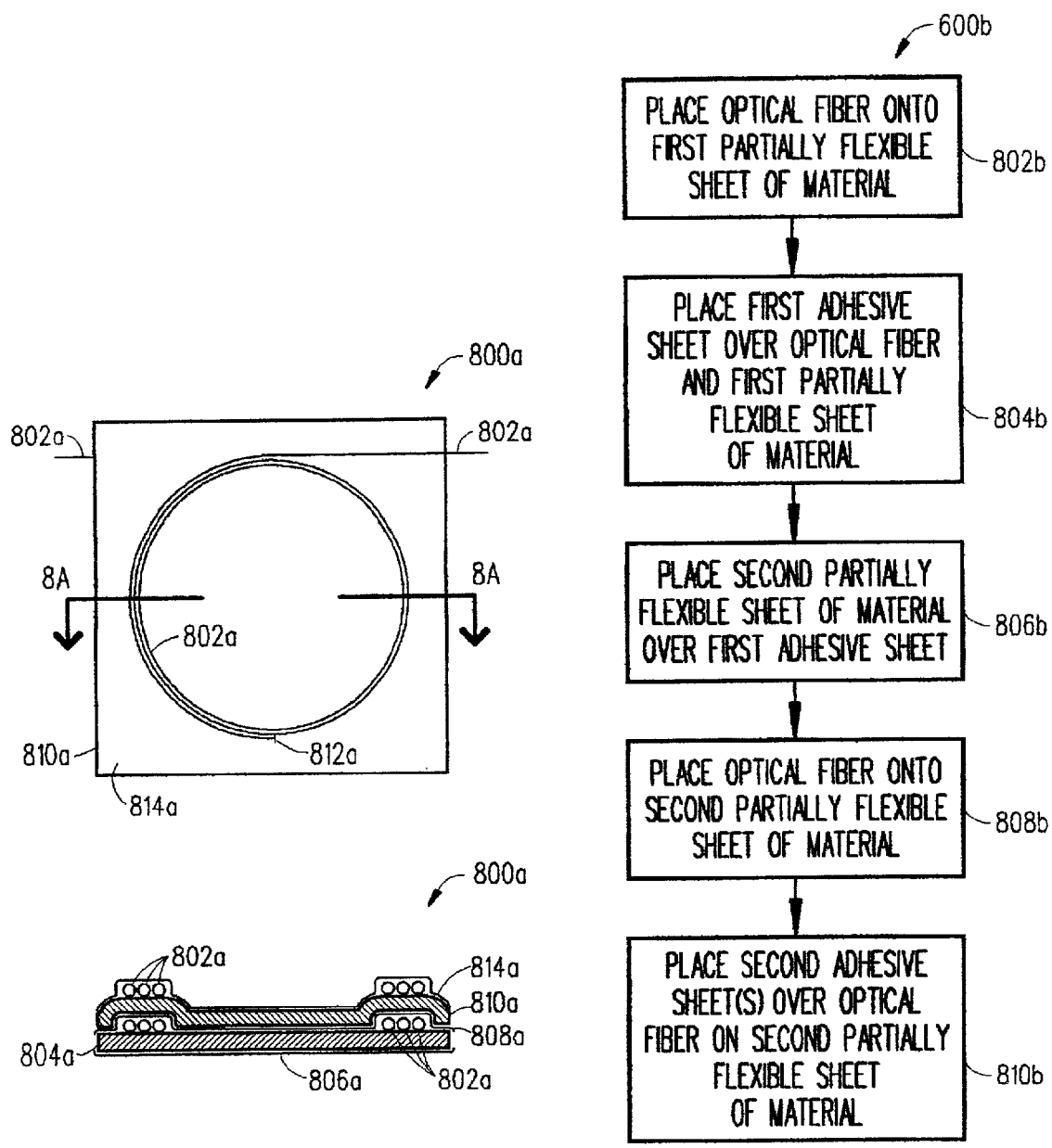

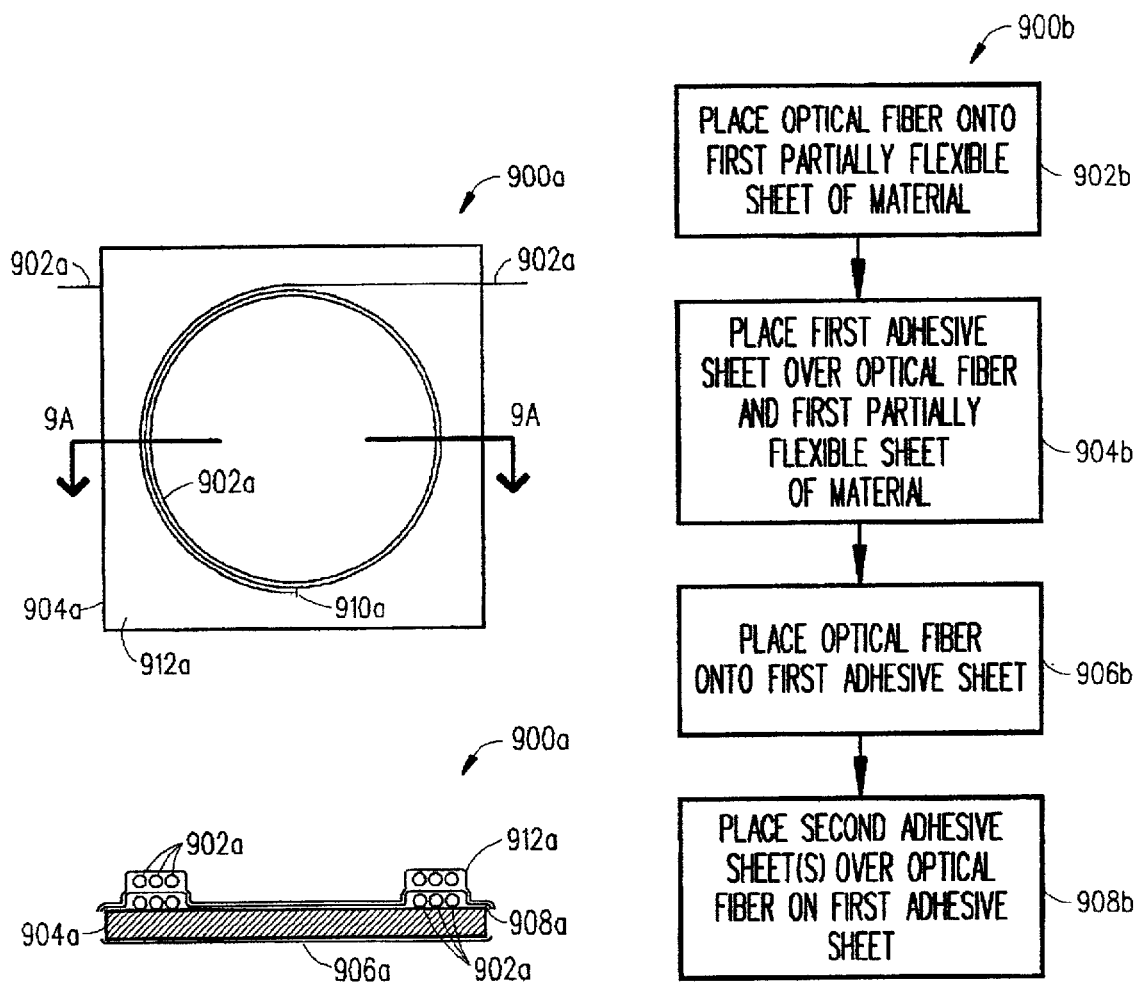

FLEXIBLE OPTICAL CIRCUIT FOR USE IN AN ERBIUM-DOPED FIBER AMPLIFIER AND METHOD FOR FABRICATING THE FLEXIBLE OPTICAL CIRCUIT

BACKGROUND OF THE INVENTION

1. Field of the Invention

The present invention relates in general to an optical repeater device and, in particular, to an erbium-doped fiber amplifier that uses a flexible optical circuit to amplify an optical signal.

2. Description of Related Art

An erbium-doped fiber amplifier (EDFA) is basically an optical repeater device that functions to boost the amplitude of optical signals traveling through a fiber optic communications system. In particular, the EDFA incorporates a variety of components including a laser diode, a multiplexer and an optical fiber which is doped with the rare earth element erbium. The laser diode emits light having an infrared wavelength of 980 nm or 1480 nm that is passed through the multiplexer into the erbium-doped optical fiber. The emitted light excites the erbium atoms in the optical fiber. Then when an input optical signal having a wavelength of between 1530 nm and 1620 nm passes through the multiplexer and enters the optical fiber it stimulates the excited erbium atoms to emit photons at the same wavelength as the input optical signal. This action amplifies the input optical signal to a higher power by effectively boosting the amplitude of the input optical signal. Examples of two traditional EDFAs 100 and 200 are briefly discussed below with respect to FIGS. 1 and 2.

Referring to FIG. 1 (PRIOR ART), there is a block diagram illustrating the basic components of a traditional EDFA 100. The EDFA 100 includes a variety of components including a laser diode 102, a multiplexer 104 and a custom-designed bobbin 106 that holds a predetermined length of erbium-doped optical fiber 108. The optical fiber 108 which can be relatively long (e.g., ~50 m) is wrapped around the bobbin 106 before being placed in a package 110. The package 110 contains the various components that make-up the EDFA 100 including the laser diode 102, the multiplexer 104 and the bobbin 106. In operation, the EDFA 100 receives an input optical signal 112 that is coupled by the multiplexer 104 along with the light from the laser diode 102 into the erbium-doped optical fiber 108 which becomes excited by the light from the laser diode 102 and outputs an amplified optical signal 114.

Unfortunately, there are a number of disadvantages associated with using the bobbin 106 to hold the optical fiber 108. First, the bobbin 106 needs to be custom designed so it can fit within the package 110. Secondly, the bobbin 106 itself is bulky and restricts the overall outline of the package 110. Thirdly, the optical fiber 108 may be stressed if the optical fiber 108 is wrapped to tight around the bobbin 106. As such, the custom-designed bobbin 106 delays and adds complexity to the design of the EDFA 100 and can also adversely affect the operability of the EDFA 100.

Referring to FIG. 2 (PRIOR ART), there is a block diagram illustrating the basic components of another traditional EDFA 200. The EDFA 200 includes a variety of components including a laser diode 202, a multiplexer 204 and a predetermined length of erbium-doped optical fiber 206 that is held together by a fastener 208 including, for example, wire, string, tape, or glue (shown and described below as three wires/strings 208). Prior to being inserted into the EDFA 200, the optical fiber 206 which can be relatively long (e.g., ~50 m) is wrapped around a customed-designed fixture 210 (e.g., bobbin) (see exploded view). Once the desired length of optical fiber 206 is wrapped around the fixture 210, then the optical fiber 206 is removed from the fixture 210 and the loose coil of optical fiber 206 is contained by the wire/string 208 (see exploded view). The optical fiber 206 that is held together by the wire/string 208 is then placed in a package 212. The package 212 contains the various components that make-up the EDFA 200 including the laser diode 202, the multiplexer 204 and the optical fiber 206. In operation, the EDFA 200 receives an input optical signal 214 that is coupled by the multiplexer 204 along with the light from the laser diode 202 into the erbium-doped optical fiber 206 which becomes excited by the light from the laser diode 202 and outputs an amplified optical signal 216.

Unfortunately, there are a number of disadvantages associated with using the fixture 210 to wrap the optical fiber 206 and for using the wire/string 208 to contain the optical fiber 206. First, the fixture 210 needs to be custom designed such that the coil of optical fiber 208 has the desired diameter so it can fit within the package 212. Secondly, the optical fiber 206 may be stressed if the optical fiber 206 is wrapped to tight around the fixture 210. Thirdly, the optical fiber 206 may be stressed if the wire/string 208 is wrapped to tight around the optical fiber 206. As such, the custom-designed fixture 210 delays and adds complexity to the design of the EDFA 200 and the use of wire/string 208 to hold the loose coil of optical fiber 206 can adversely affect the operability of the EDFA 200. Accordingly, there is a need for a new way to wrap and support the optical fiber that is placed inside the package of an EDFA. This need and other needs are satisfied by the flexible optical circuit and the method of the present invention.

BRIEF DESCRIPTION OF THE INVENTION

The present invention includes an erbium-doped fiber amplifier, a flexible optical circuit and a method for fabricating the flexible optical circuit. Basically, the erbium-doped amplifier includes a laser diode, a multiplexer and a flexible optical circuit. The flexible optical circuit in one embodiment includes a predetermined length of optical fiber that is placed onto and secured to a partially flexible sheet of material. Several different embodiments of the flexible optical circuit are described herein. In operation, the erbium-doped amplifier receives an optical signal that is coupled by the multiplexer along with a light from the laser diode into the erbium-doped optical fiber which becomes excited by the light from the laser diode and outputs an amplified optical signal.

BRIEF DESCRIPTION OF THE DRAWINGS

A more complete understanding of the present invention may be had by reference to the following detailed description when taken in conjunction with the accompanying drawings wherein:

FIG. 3 is a block diagram illustrating the basic components of an EDFA in accordance with the present invention;

FIG. 4 illustrates a top view and a cross-sectional side view of a flexible optical circuit that can be used in the EDFA shown in FIG. 3;

FIG. 5 is a flowchart illustrating the basic steps of a preferred method for fabricating the flexible optical circuit shown in FIG. 4;

FIG. 8A illustrates a top view and a cross-sectional side view of a third embodiment of the flexible optical circuit that can be used in the EDFA shown in FIG. 3;

FIG. 8B is a flowchart illustrating the basic steps of a preferred method for fabricating the third embodiment of the flexible optical circuit shown in FIG. 8A;

FIG. 9A illustrates a top view and a cross-sectional side view of a fourth embodiment of the flexible optical circuit that can be used in the EDFA shown in FIG. 3;

FIG. 9B is a flowchart illustrating the basic steps of a preferred method for fabricating the fourth embodiment of the flexible optical circuit shown in FIG. 9A;

DETAILED DESCRIPTION OF THE DRAWINGS

Figure 1:
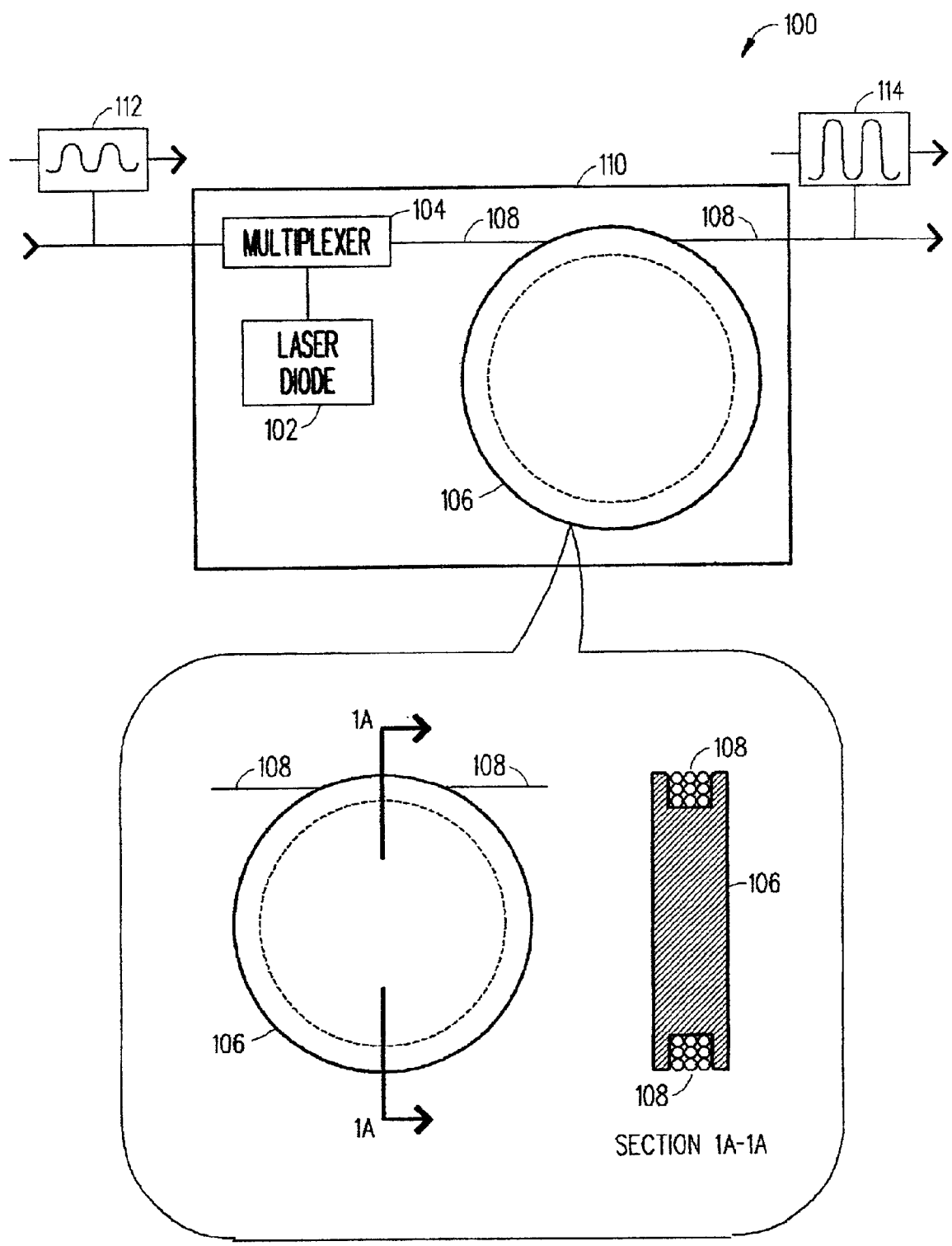
FIG. 1 (PRIOR ART) is a block diagram illustrating the basic components of a traditional EDFA.

Referring to FIGS. 3–11, there are disclosed in accordance with the present invention an EDFA 300, a flexible optical circuit 400 and a method 500 for fabricating the flexible optical circuit 400. There are also disclosed herein seven different embodiments of the flexible optical circuit 600a, 700a, 800a . . . 1100a. Although the present invention is described where there is only one amplifier associated with the EDFA 300, it should be understood that there can be more than one amplifier associated the EDFA 300. For example, the EDFA 300 may be a dual-EDFA 300 or a quad-EDFA 300. Accordingly, the EDFA 300, the flexible optical circuit 400 and the method 500 for fabricating the flexible optical circuit 400 should not be construed in a limited manner.

Referring to FIG. 3, there is a block diagram illustrating the basic components of the EDFA 300. Certain details and components associated with the EDFA 300 are well known in the industry and as such, for clarity, are not described herein. Therefore, the description provided below in relation to the EDFA 300 omits those components not necessary to understand the invention.

Basically, the EDFA 300 includes a package 302 that contains the various components that make-up the EDFA 300 including a laser diode 304, a multiplexer 306 and a flexible optical circuit 400. The flexible optical circuit 400 includes a predetermined length of optical fiber 402 that is secured to a partially flexible sheet of material 404. An adhesive sheet 406 (shown as a transparent adhesive sheet 406) can be used to secure the optical fiber 402 to the partially flexible sheet of material 404. In the preferred embodiment, the partially flexible sheet of material 404 is a laminate material 404 such as a polyimide sheet 404. And, the optical fiber 402 is an optical fiber 402 doped with a rare earth element such as erbium (e.g., erbium-doped optical fiber 402). More details about the flexible optical circuit 400 and the method 500 for fabricating the flexible optical circuit 400 are described below with respect to FIGS. 4 and 5.

In particular, the EDFA 300 is an optical repeater device that functions to boost the amplitude of an input optical signal 308 traveling through a fiber optic communications system. As described above, the EDFA 300 incorporates a variety of components including the laser diode 304, the multiplexer 306 and the flexible optical circuit 400. The flexible optical circuit 400 includes a predetermined length of optical fiber 402 which is doped with the rare earth element erbium. The laser diode 302 emits a light having an infrared wavelength of 980 nm or 1480 nm that is passed through the multiplexer 306 into the erbium-doped optical fiber 402. The emitted light excites the erbium atoms in the optical fiber 402. Then when the input optical signal 308 having a wavelength of between 1530 nm and 1620 nm passes through the multiplexer 306 and enters the optical fiber 402 it stimulates the excited erbium atoms to emit photons at the same wavelength as the input optical signal 308. This action amplifies the input optical signal 308 to a higher power by effectively boosting the amplitude of the input optical signal 308. In other words, the EDFA 300 receives an input optical signal 308 that is coupled by the multiplexer 306 along with the light from the laser diode 302 into the optical fiber 402 which becomes excited by the light from the laser diode 302 and outputs an amplified optical signal 310.

Referring to FIGS. 4 and 5, there are respectively illustrated different views of the flexible optical circuit 400 and a flowchart illustrating the steps of a preferred method 500 for fabricating the flexible optical circuit 400. The flexible optical circuit 400 includes a predetermined length of optical fiber 402 (e.g., erbium-doped optical fiber 402) that is placed and secured onto a partially flexible sheet of material 404 (e.g., laminate material such as a single-sided polyimide sheet 404). The length of the optical fiber 402 needed in an EDFA 300 can vary between 3 m and 50 m (for example) depending on the required dB loss needed in the particular amplifier application. The optical fiber 402 can be secured to the partially flexible sheet of material 404 in a variety of ways including, for example, using one or more adhesive sheets 406 (shown is one transparent adhesive sheet 406). It should be understood that the EDFA 300 can incorporate many different configurations of a flexible optical circuit besides the aforementioned flexible optical circuit 400. Some exemplary configurations of the flexible optical circuit in accordance with the present invention are described in greater detail below as flexible optical circuits 600a, 700a, 800a . . . 1100a in FIGS. 6–11.

The flexible optical circuit 400 is fabricated by providing (step 502) the partially flexible sheet of material 404 and then placing (step 504) and securing (step 506) the optical fiber 402 onto the partially flexible sheet of material 404. Again, the adhesive sheet 406 (shown as a transparent adhesive sheet 406) can be used to secure the optical fiber 402 to the partially flexible sheet of material 404. In the preferred embodiment, a machine is used to place or loop side-by-side the desired length of erbium-doped optical fiber 402 onto the "sticky" side of the polyimide sheet 404. The machine is able to calculate the desired length of optical fiber 402 to be placed onto the polyimide sheet 404 by knowing the decibel loss/meter property indicated on the particular spool of optical fiber 402 and knowing the total amount of decibel loss desired for the particular EDFA 300. As such, the same types of EDFAs 300 may have optical fibers 402 with different lengths if the optical fibers 402 used in the EDFAs 300 are on different spools that have different decibel loss/meter properties. The machine is also capable of placing the adhesive sheet 406 over the optical fiber 402 and the polyimide sheet 404. Essentially, the machine is capable of fabricating the flexible optical circuits 600a, 700a, 800a . . . 1100a described below with respect to FIGS. 6–11.

The flexible optical circuit 400 and different embodiments of the flexible optical circuit 600a, 700a, 800a . . . 1100a may have a center portion 408 or outside edges 410 of the partially flexible sheet of material 404 cut-out so that the flexible circuit takes up less space in the package 302. In addition, if the center portion 408 is cut-out, then other components of the EDFA 300 can be placed in the center of the flexible optical circuit 400 which reduces the overall size of the EDFA 300.

Figure 2:
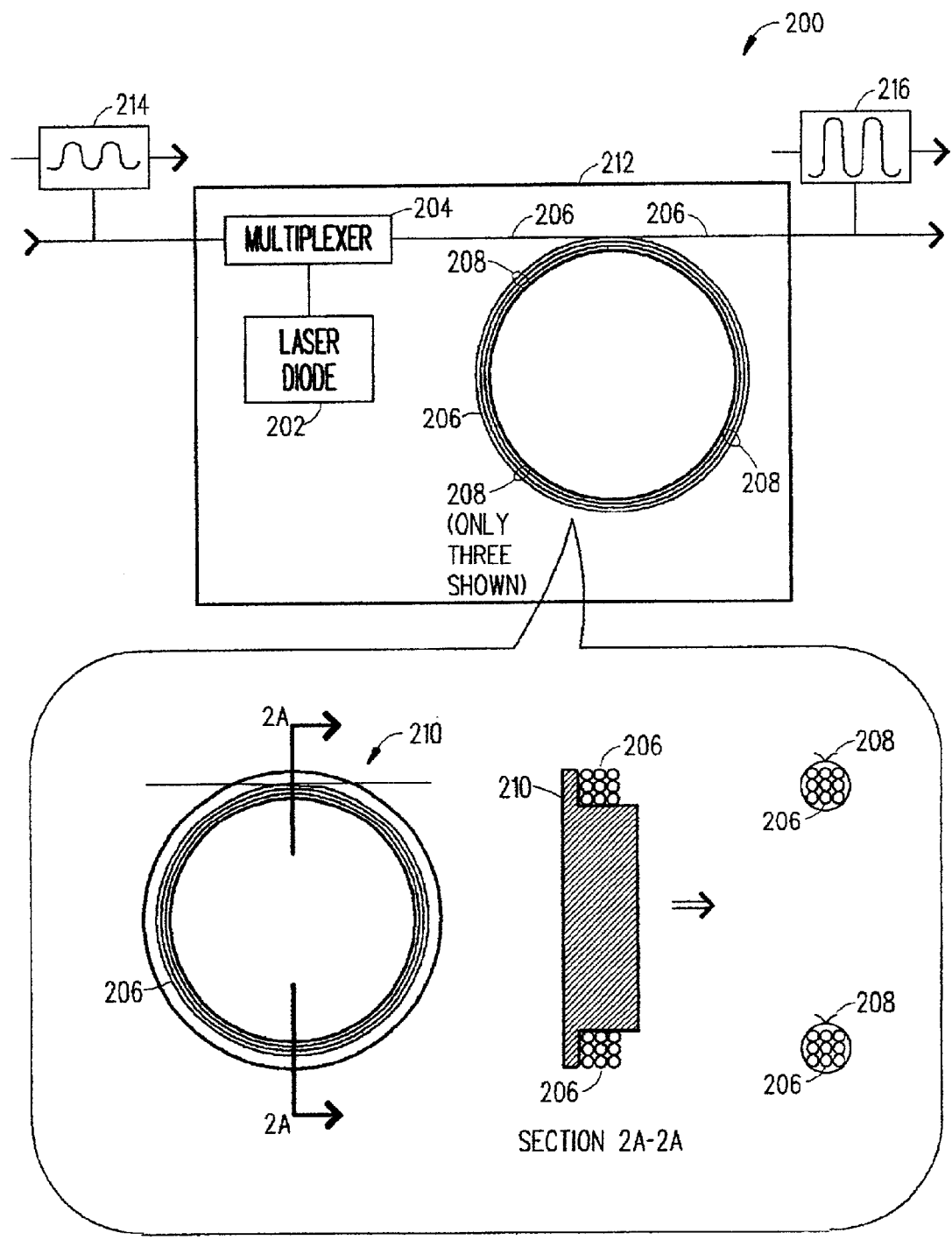
FIG. 2 (PRIOR ART) is a block diagram illustrating the basic components of another traditional EDFA.

As can be seen, the flexible optical circuit 400 and in particular the partially flexible sheet of material 404 which is used to hold the optical fiber 402 is a marked improvement over the custom-designed bobbins 106 and 210 and the wire/string 208 used to hold the optical fiber in the traditional EDFAs 100 and 200 (see FIGS. 1 and 2). For example, the optical fiber 402 can be automatically spooled onto the partially flexible sheet of material 404 in a way that substantially reduces if not eliminates the stress on the optical fiber 402. This is not true in the traditional EDFAs 100 and 200 where the optical fiber can be stressed when it is wrapped around a custom-designed bobbin 106 and 210 or secured together by wire/string 208.

Figure 6A:
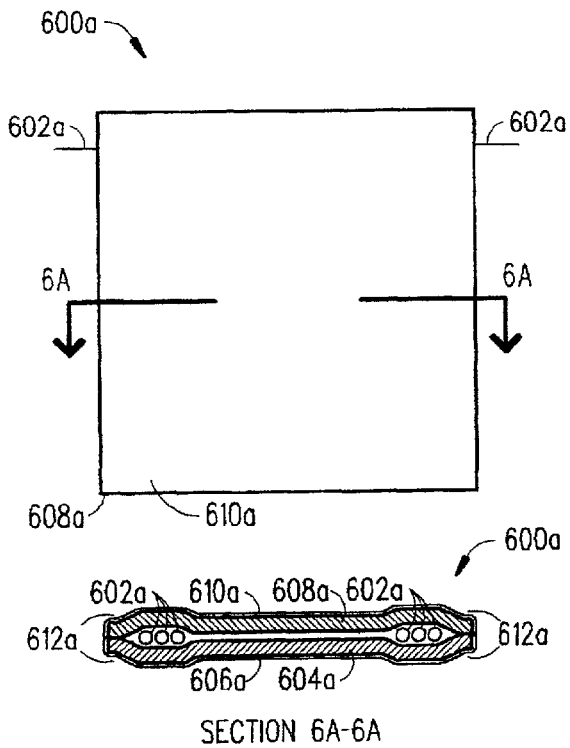
FIG. 6A illustrates a top view and a cross-sectional side view of a first embodiment of the flexible optical circuit that can be used in the EDFA shown in FIG. 3.
Figure 6B:
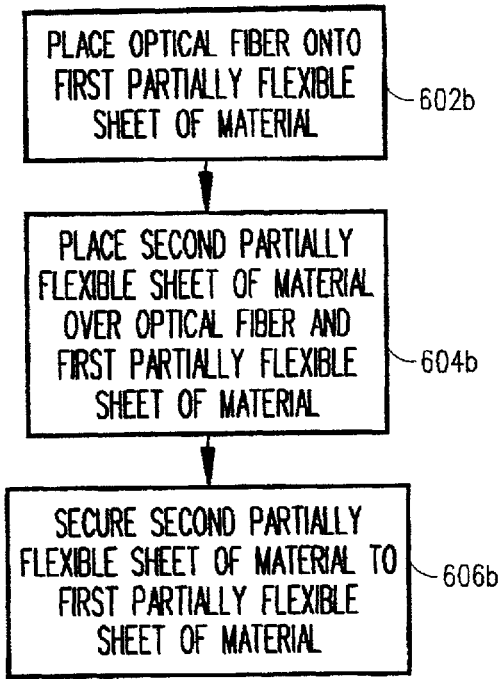
FIG. 6B is a flowchart illustrating the basic steps of a preferred method for fabricating the first embodiment of the flexible optical circuit shown in FIG. 6A.

Referring to FIGS. 6A and 6B, there are respectively illustrated different views of a first embodiment of a flexible optical circuit 600a and a method 600a for fabricating the flexible optical circuit 600a. The flexible optical circuit 600a includes a predetermined length of erbium-doped optical fiber 602a that is placed (step 602b) or looped side-by-side onto a first single-sided partially flexible sheet of material 604a (e.g., single-sided polyimide sheet 604a). Tape 606a or some other type of covering is located on the bottom side of the first partially flexible sheet of material 604a. The top side or "sticky" side of the first partially flexible sheet of material 604a receives the optical cable 602a. A second single-sided partially flexible sheet of material 608a (e.g., single-sided polyimide sheet 606a) is placed (step 604b) over the optical fiber 602a and the first partially flexible sheet of material 604a. Tape 610a or some other type of covering is located on the top side of the second partially flexible sheet of material 608a. The bottom side or "sticky" side of the second partially flexible sheet of material 608a is located next to the optical fiber 602a and the first partially flexible sheet of material 604a. Tabs 612 or adhesive tape (not shown) can be used to secure the optical fiber 602a between the first partially flexible sheet of material 604a and the second partially flexible sheet of material 608a.

Figure 7A:
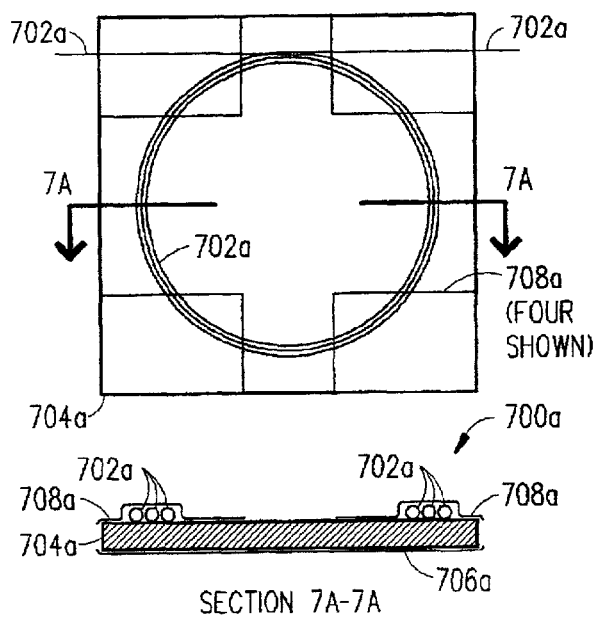
FIG. 7A illustrates a top view and a cross-sectional side view of a second embodiment of the flexible optical circuit that can be used in the EDFA shown in FIG. 3.
Figure 7B:
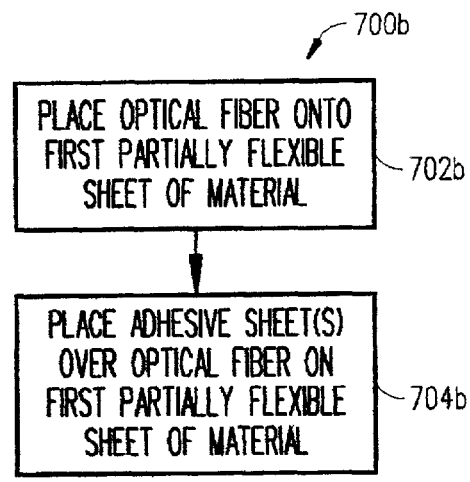
FIG. 7B is a flowchart illustrating the basic steps of a preferred method for fabricating the second embodiment of the flexible optical circuit shown in FIG. 7A.

Referring to FIGS. 7A and 7B, there are respectively illustrated different views of a second embodiment of a flexible optical circuit 700a and a method 700b for fabricating the flexible optical circuit 700a. The flexible optical circuit 700a includes a predetermined length of erbium-doped optical fiber 702a that is placed (step 702b) or looped side-by-side onto a first single-sided partially flexible sheet of material 704a (e.g., single-sided polyimide sheet 704a). Tape 706a or some other type of covering is located on the bottom side of the first partially flexible sheet of material 704a. The top side or "sticky" side of the partially flexible sheet of material 704a receives the optical cable 702a. One or more single-sided adhesive sheets 708a (shown as four transparent adhesive sheets 708a) are placed (step 704b) over all or a portion the optical fiber 702a and the first partially flexible sheet of material 704a. The adhesive sheet 708a helps secure the optical fiber 702a to the first partially flexible sheet of material 704a.

Referring to FIGS. 8A and 8B, there are respectively illustrated different views of a third embodiment of a flexible optical circuit 800a and a method 800b for fabricating the flexible optical circuit 800a. The flexible optical circuit 800a includes a predetermined length of erbium-doped optical fiber 802a that is placed (step 800b) or looped side-by-side onto a first single-sided partially flexible sheet of material 804a (e.g., single-sided polyimide sheet 804a). Tape 806a or some other type of covering is located on the bottom side of the first partially flexible sheet of material 804a. The top side or "sticky" side of the first partially flexible sheet of material 804a receives the optical cable 802a. A first single-sided adhesive sheet 808a is then placed (step 804b) over the optical fiber 802a and the first partially flexible sheet of material 804a. Thereafter, a second single-sided partially flexible sheet of material 810a (e.g., single-sided polyimide sheet 810a) is placed (step 806b) over the first adhesive sheet 808a. The optical fiber 802a is routed through slits 812a in the first adhesive sheet 808a and the second partially flexible sheet of material 810a and then placed (step 808b) or looped side-by-side onto the second partially flexible sheet of material 810a. Steps 804b, 806b and 808b can be repeated as many times as needed to "sandwich" the desired length of optical fiber 802a within the flexible optical circuit 800a. Finally, one or more single-sided adhesive sheets 814a (shown as a single transparent adhesive sheet 814a) is then placed (step 810b) over all or a portion of the top layer of optical fiber 802a. In addition, tabs (not shown) can be used to secure the optical fiber 802a between the partially flexible sheets of materials 804a and 810a (see, e.g., tabs 612a in FIG. 6A).

Referring to FIGS. 9A and 9B, there are respectively illustrated different views of a fourth embodiment of a flexible optical circuit 900a and a method 900b for fabricating the flexible optical circuit 900a. The flexible optical circuit 900a includes a predetermined length of erbium-doped optical fiber 902a that is placed (step 902b) or looped side-by-side onto a first single-sided partially flexible sheet of material 904a (e.g., single-sided polyimide sheet 904a). Tape 906a or some other type of covering is located on the bottom side of the first partially flexible sheet of material 904a. The top side or "sticky" side of the first partially flexible sheet of material 904a receives the optical cable 902a. A first double-sided "sticky" adhesive sheet 908a is then placed (step 904b) over the optical fiber 902a and the first partially flexible sheet of material 904a. The optical fiber 902a is routed through a slit 910a in the first adhesive sheet 908a and then placed (step 906b) or looped side-by-side onto the first adhesive sheet 908a. Steps 904b and 906b can be repeated as many times as needed to "sandwich" the desired length of optical fiber 902a within the flexible optical circuit 900a. Finally, one or more adhesive sheets 912a (shown as a single transparent adhesive sheet 912a) is then placed over the optical fiber 902a, the adhesive sheet 908a and the partially flexible sheet of material 904a. The adhesive sheet 912a helps secure the optical fiber 902a to the partially flexible sheet of material 904a.

Figures 10A, 10B:
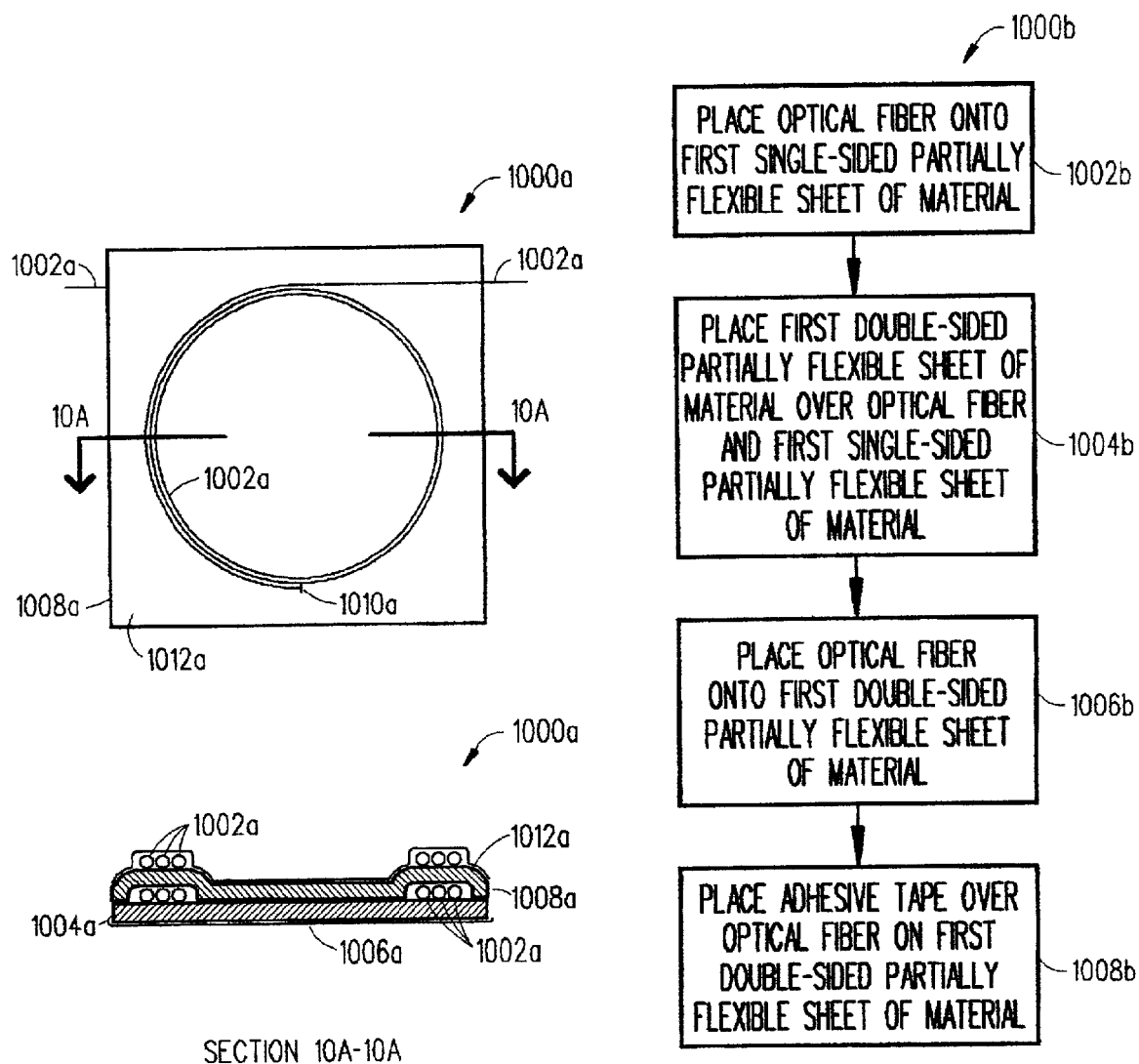
FIG. 10A illustrates a top view and a cross-sectional side view of a fifth embodiment of the flexible optical circuit that can be used in the EDFA shown in FIG. 3.
FIG. 10B is a flowchart illustrating the basic steps of a preferred method for fabricating the fifth embodiment of the flexible optical circuit shown in FIG. 10A.

Referring to FIGS. 10A and 10B, there are respectively illustrated different views of a fifth embodiment of a flexible optical circuit 1000a and a method 1000b for fabricating the flexible optical circuit 1000a. The flexible optical circuit 1000a includes a predetermined length of erbium-doped optical fiber 1002a that is placed (step 1002b) or looped side-by-side onto a first single-sided partially flexible sheet of material 1004a (e.g., single-sided polyimide sheet 1004a). Tape 1006a or some other type of covering is located on the bottom side of the first partially flexible sheet of material 1004a. The top side or "sticky" side of the first partially flexible sheet of material 1004a receives the optical cable 1002a. A first double-sided partially flexible sheet of material 1008a (e.g., double-sided "sticky" polyimide sheet 1008a) is placed (step 1004b) over the optical fiber 1002a and the first partially flexible sheet of material 1004a. The optical fiber 1002a is routed through a slit 1010a in the partially flexible sheet of material 1008a and then placed (step 906b) or looped side-by-side onto the partially flexible sheet of material 1008a. Steps 1004b and 1006b can be repeated as many times as needed to "sandwich" the desired length of optical fiber 1002a within the flexible optical circuit 1000a. Finally, an adhesive sheet 1012a (shown as a transparent adhesive sheet 1012a) or another single-sided partially flexible sheet of material (not shown) is then placed over the top layer of optical fiber 1002a. In addition, tabs (not shown) can be used to secure together the optical fiber 1002 between the partially flexible sheets of materials 1004a and 1008a (see, e.g., tabs 612a in FIG. 6A).

Figures 11A, 11B:
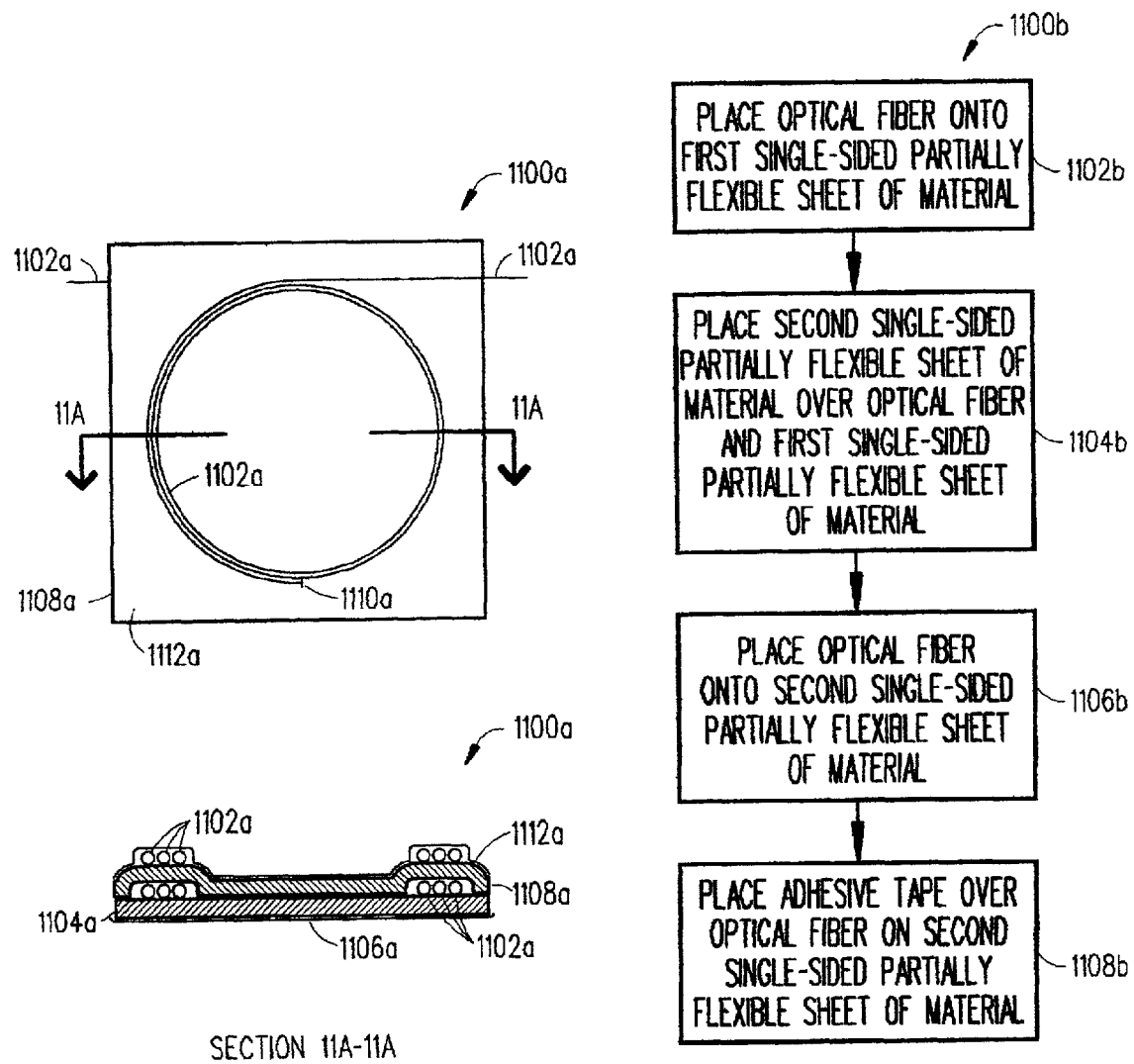
FIG. 11A illustrates a top view and a cross-sectional side view of a sixth embodiment of the flexible optical circuit that can be used in the EDFA shown in FIG. 3.
FIG. 11B is a flowchart illustrating the basic steps of a preferred method for fabricating the sixth embodiment of the flexible optical circuit shown in FIG. 11A.

Referring to FIGS. 11A and 11B, there are respectively illustrated different views of a sixth embodiment of a flexible optical circuit 1100a and a method 1100b for fabricating the flexible optical circuit 1100a. The flexible optical circuit 1100a includes a predetermined length of erbium-doped optical fiber 1102a that is placed (step 1102b) or looped side-by-side onto a first single-sided partially flexible sheet of material 1104a (e.g., single-sided polyimide sheet 1104a). Tape 1106a or some other type of covering is located on the bottom side of the first partially flexible sheet of material 1104a. The top side or "sticky" side of the first partially flexible sheet of material 1104a receives the optical cable 1102a. A second single-sided partially flexible sheet of material 1108a (e.g., single-sided polyimide sheet 1108a) is placed (step 1104b) over the optical fiber 1102a and the first partially flexible sheet of material 1104a. The optical fiber 1102a is routed through a slit 1110a in the second partially flexible sheet of material 1108a and then placed (step 1106b) or looped side-by-side onto a "sticky" side of the second partially flexible sheet of material 1108a. Steps 1104b and 1106b can be repeated as many times as needed to "sandwich" the desired length of optical fiber 1102a within the flexible optical circuit 1100a. Finally, an adhesive sheet 1112a (shown as transparent adhesive sheet 1112a) or a single-sided partially flexible sheet of material (not shown) is then placed over the top layer of optical fiber 1102a. In addition, tabs (not shown) on the partially flexible sheet of materials 1104a and 1108a can be used to secure together the partially flexible sheets of materials 1104a and 1108a (see, e.g., tabs 612a in FIG. 6A).

From the foregoing, it can be readily appreciated by those skilled in the art that the flexible optical circuits 400, 600a, 700a, 800a . . . 1100a are less expensive and can be assembled with lower overhead costs by a machine in less time than was needed to organize and secure the optical fiber in the traditional EDFAs 100 and 200 (see FIGS. 1 and 2). It should also be appreciated that the flexible optical circuits 400, 600a, 700a, 800a . . . 1100a protects the optical fiber better than the custom-designed bobbins 106 and 210 and wire/string 208 in the traditional EDFAs 100 and 200 (see FIGS. 1 and 2).

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. An amplifier, comprising:
   a laser diode;
   a multiplexer; and
   a separable flexible optical circuit including a length of previously solidified optical fiber secured to a partially flexible sheet of material, wherein said multiplexer inputs an optical signal and a light from said laser diode into said optical fiber which becomes excited by the light and amplifies the optical signal.

2. The amplifier of claim 1, further comprising a package that contains said laser diode, said multiplexer and said flexible optical circuit.

3. The amplifier of claim 1, wherein said partially flexible sheet of material is a laminate material.

4. The amplifier of claim 3, wherein said laminate material is a polyimide sheet.

5. The amplifier of claim 1, wherein said optical fiber is an erbium-doped optical fiber.

6. The amplifier of claim 1, wherein said amplifier is an erbium-doped fiber amplifier.

7. A method for fabricating a separable flexible optical circuit that is incorporated within an amplifier, said method comprising the steps of:
   providing a partially flexible sheet of material;
   placing a length of previously solidified optical fiber onto said partially flexible sheet of material; and
   securing said optical fiber onto said partially flexible sheet of material.

8. The method of claim 7, further comprising the step of inserting said flexible optical circuit into a package that also contains at least a laser diode and a multiplexer which make-up said amplifier.

9. The method of claim 7, wherein said partially flexible sheet of material is a laminate material.

10. The method of claim 9, wherein said laminate material is a polyimide sheet.

11. The method of claim 7, wherein said optical fiber is an erbium-doped optical fiber.

12. The method of claim 7, wherein said amplifier is an erbium-doped fiber amplifier.

13. A separable flexible optical circuit for use in an amplifier, comprising:
   a partially flexible sheet of material; and
   a previously solidified optical fiber secured to said partially flexible sheet of material which together resemble said separable flexible optical circuit; and
   said amplifier including:
      a laser diode; and
      a multiplexer that inputs an optical signal and a light from said laser diode into said optical fiber which becomes excited by the light and outputs an amplified optical signal.

14. The flexible optical circuit of claim 13, wherein said amplifier further includes a package that contains said laser diode, said multiplexer and said flexible optical circuit.

15. The flexible optical circuit of claim 13, wherein said partially flexible sheet of material is a laminate material.

16. The flexible optical circuit of claim 15, wherein said laminate material is a polyimide sheet.

17. The flexible optical circuit of claim 13, wherein said optical fiber is an erbium-doped optical fiber.

18. The flexible optical circuit of claim 13, wherein said amplifier is an erbium-doped fiber amplifier.

19. The flexible optical circuit of claim 13, wherein said flexible optical circuit is configured in a manner such that said optical fiber is located between two single-sided partially flexible sheets of materials.

20. The flexible optical circuit of claim 13, wherein said flexible optical circuit is configured in a manner such that said optical fiber is located between a single-sided adhesive sheet and a single-sided partially flexible sheet of material.

21. The flexible optical circuit of claim 13, wherein said flexible optical circuit is configured in a manner such that said optical fiber is secured to a single-sided partially flexible sheet of material and then sandwiched between one or more pairs of a single-sided adhesive sheet attached to single-sided partially flexible sheet of material and then covered by a single-sided adhesive sheet.

22. The flexible optical circuit of claim 13, wherein said flexible optical circuit is configured in a manner such that said optical fiber is secured to a single-sided partially flexible sheet of material and then sandwiched between one or more pairs of a double-sided adhesive sheet and then covered by a single-sided adhesive sheet.

23. The flexible optical circuit of claim 13, wherein said flexible optical circuit is configured in a manner such that said optical fiber is secured to a single-sided partially flexible sheet of material and then sandwiched between one or more pairs of a double-sided partially flexible sheet of material and then covered by a single-sided adhesive sheet.

24. The flexible optical circuit of claim 13, wherein said flexible optical circuit is configured in a manner such that said optical fiber is secured to a single-sided partially flexible sheet of material and then sandwiched between one or more pairs of a single-sided partially flexible sheet of material and then covered by a single-sided adhesive sheet.

* * * * *